(12) United States Patent
Tsung-Te

(10) Patent No.: US 7,922,222 B2
(45) Date of Patent: Apr. 12, 2011

(54) ENGAGING APPARATUS AND ELECTRONIC EQUIPMENT UTILIZING THE SAME

(75) Inventor: Lin Tsung-Te, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 281 days.

(21) Appl. No.: 11/984,158

(22) Filed: Nov. 14, 2007

(65) Prior Publication Data

US 2009/0013499 A1 Jan. 15, 2009

(30) Foreign Application Priority Data

Sep. 7, 2007 (TW) ................................ 96133400 A

(51) Int. Cl.
*E05C 1/08* (2006.01)
*E05C 19/10* (2006.01)

(52) U.S. Cl. ................................. 292/163; 292/DIG. 17

(58) Field of Classification Search .................. 292/121, 292/163, DIG. 17; 16/342, 382; 361/379.09, 361/379.58
See application file for complete search history.

(56) References Cited

U.S. PATENT DOCUMENTS

| | | | | |
|---|---|---|---|---|
| 3,432,881 A | * | 3/1969 | Putsch et al. | 16/333 |
| 3,686,793 A | * | 8/1972 | Meniolle d'Hautrhuille | 49/131 |
| 6,129,395 A | * | 10/2000 | Schlesener et al. | 292/128 |
| 6,714,408 B1 | * | 3/2004 | Wang et al. | 361/679.09 |
| 6,762,931 B2 | * | 7/2004 | Chen | 361/679.11 |
| 6,785,128 B1 | * | 8/2004 | Yun | 361/679.27 |
| 6,829,140 B2 | * | 12/2004 | Shimano et al. | 361/679.09 |
| 6,845,005 B2 | * | 1/2005 | Shimano et al. | 361/679.06 |
| 6,980,423 B2 | * | 12/2005 | Tanaka et al. | 361/679.06 |
| 2007/0146984 A1 | * | 6/2007 | Lin | 361/683 |

FOREIGN PATENT DOCUMENTS

TW 534362 5/2003

OTHER PUBLICATIONS

English language translation of abstract of TW 534362 (published May 21, 2003).

* cited by examiner

*Primary Examiner* — Carlos Lugo
*Assistant Examiner* — Alyson M Merlino
(74) *Attorney, Agent, or Firm* — Thomas, Kayden, Horstemeyer & Risley, LLP

(57) ABSTRACT

The invention provides an engaging apparatus utilized in equipment which includes a cover and a base. The engaging apparatus includes a pivotal device and an engaging device. The pivotal device includes a retaining portion. The cover is pivotally connected to the base by the pivotal device. The engaging device is disposed on the cover, and includes an operating portion and an engaging portion. The engaging portion cooperates with the retaining portion. When the cover is positioned at a closed position with respect to the base, the engaging portion is capable of cooperating with the retaining portion to form a locked engagement.

20 Claims, 5 Drawing Sheets

ENGAGING APPARATUS AND ELECTRONIC
EQUIPMENT UTILIZING THE SAME

BACKGROUND OF THE INVENTION

1. Field of the Invention

The invention relates to an engaging apparatus and an electronic equipment utilizing the same, and more particularly, to a hidden engaging apparatus and an electronic equipment utilizing the same.

2. Description of the Prior Art

Nowadays, a lot of electronic equipment (such as a notebook computer) has advantages of lightweight, compact size, and portability. Electronic equipment with novel appearance and functions is constantly developed, so the electronic equipment is getting popular and is welcomed by many consumers.

The opening and closing of the cover of common electronic equipment all depend on a spring lock device. As implied by the name, when the cover of the electronic equipment is closed by a user, an elastic force generated by the spring of the spring lock device assists to engage an engaging member (such as a tenon) together with a retaining member (such as a groove) to form a locked engagement.

However, the grooves and tenons of common electronic equipment are mostly exposed out of the exterior of the electronic equipment and make the whole electronic equipment less appealing in looks. Accordingly, one scope of the invention is to provide an engaging apparatus and electronic equipment utilizing the same to solve the above-mentioned problems.

SUMMARY OF THE INVENTION

The invention provides an engaging apparatus and electronic equipment utilizing the same. The invention mainly achieves the purpose of hiding the engaging apparatus in the electronic equipment by the assistance of the pivotal device of the electronic equipment.

An embodiment according to the invention is an engaging apparatus utilized in electronic equipment. The electronic equipment includes a cover and a base. The engaging apparatus includes a pivotal device and an engaging device. The pivotal device includes a retaining portion. The cover is pivotally connected to the base by the pivotal device. The engaging device is disposed on the cover and includes an operating portion and an engaging portion. The engaging portion cooperates with the retaining portion. When the cover is positioned at a closed position with respect to the base, the engaging portion is capable of cooperating with the retaining portion to form a locked engagement.

Compared with prior arts, the engaging apparatus and the electronic equipment utilizing the same according to the invention are capable of well hiding the grooves and tenons, originally exposed outside of the electronic equipment, in the electronic equipment. Accordingly, the engaging apparatus and the electronic equipment utilizing the same according to the invention benefit the appearance design of the electronic equipment and add the whole electronic equipment aesthetically beautiful.

The advantage and spirit of the invention may be understood by the following recitations together with the appended drawings.

BRIEF DESCRIPTION OF THE APPENDED DRAWINGS

DETAILED DESCRIPTION OF THE INVENTION

The first embodiment according to the invention is an engaging apparatus utilized in a kind of equipment. The engaging apparatus can be utilized in any equipment that needs to lock the cover and the base thereof, such as a laptop computer, a foldable phone, or a game console.

Figure 1A:
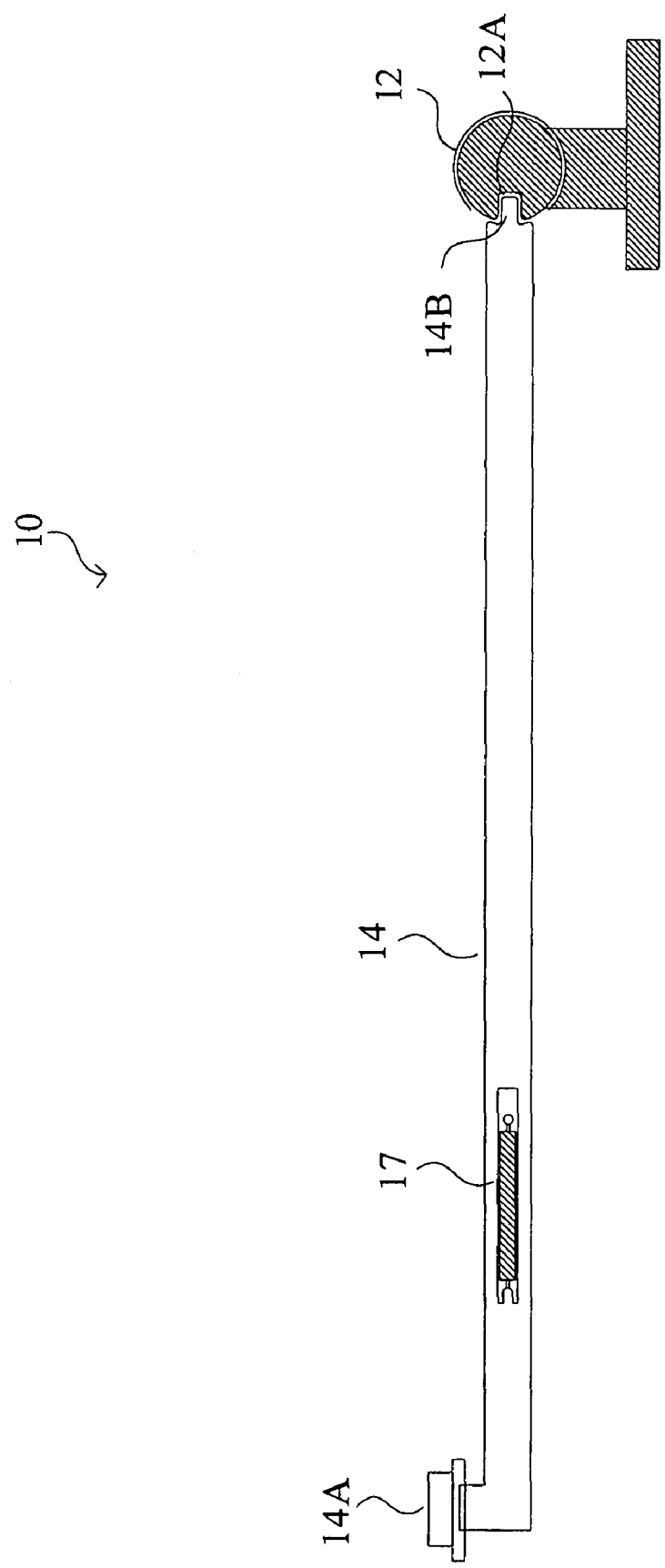
FIG. 1A is a side view illustrating an engaging apparatus according to the invention when a locked engagement is formed.
Figure 1B:
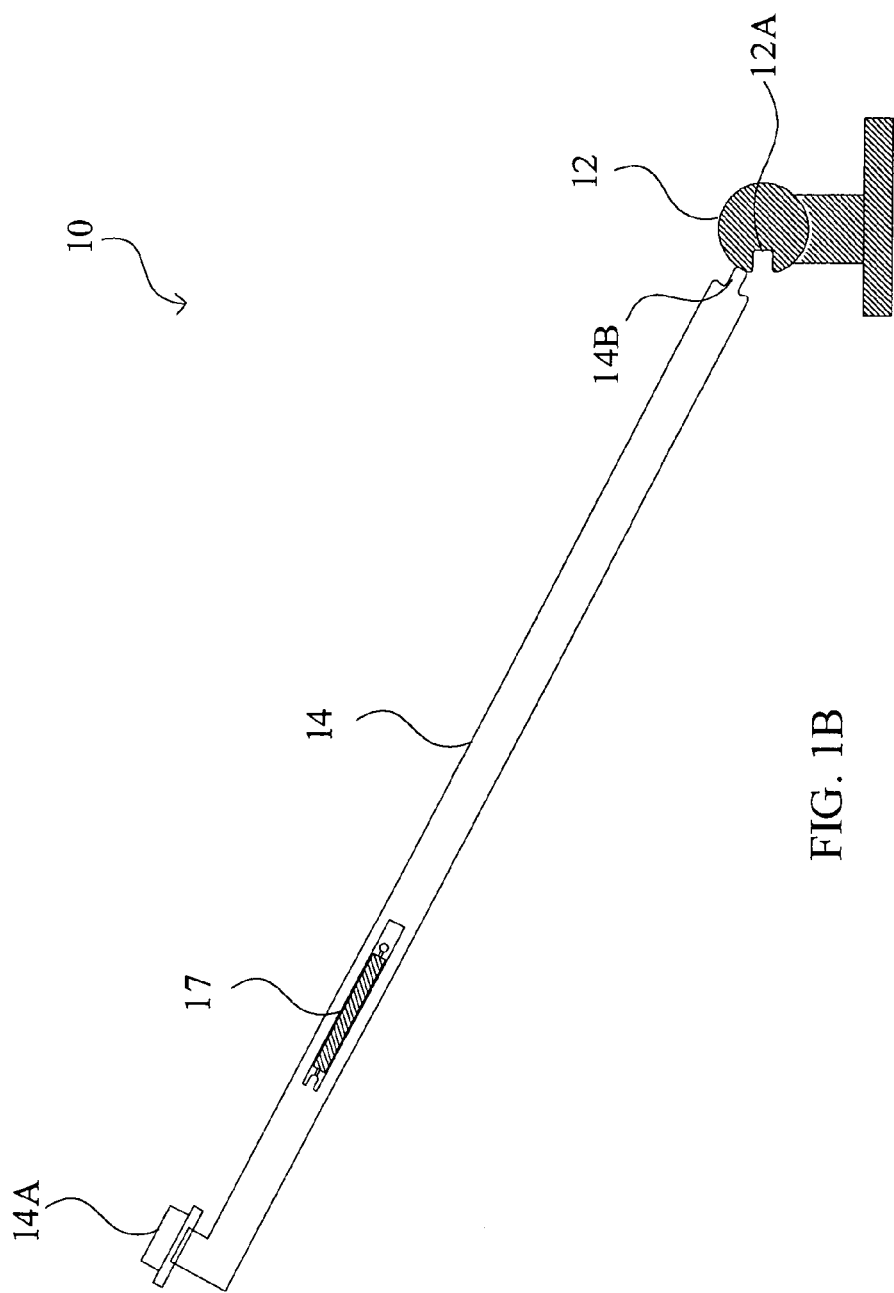
FIG. 1B is a side view illustrating the engaging apparatus according to the invention after the locked engagement is removed.
Figure 2:
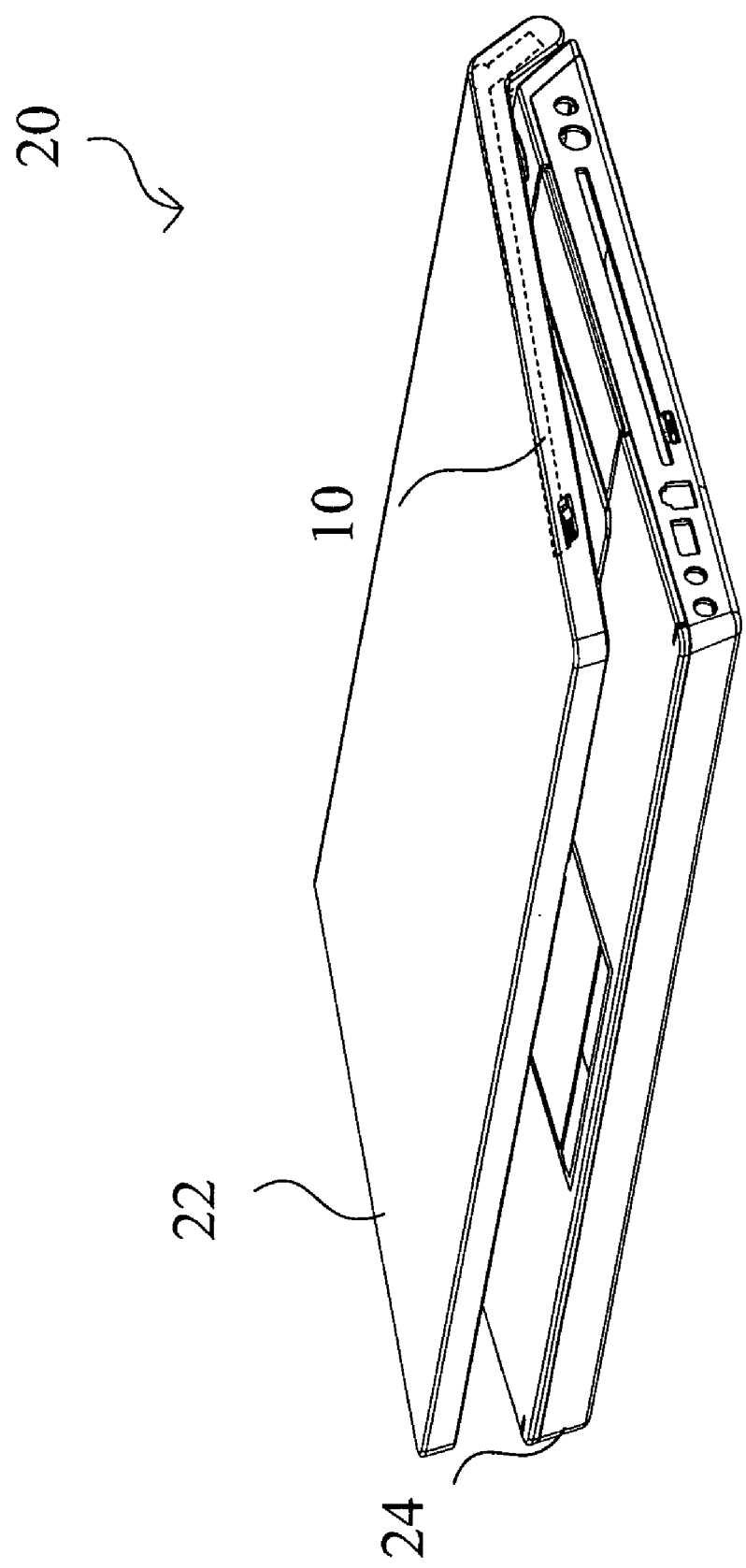
FIG. 2 is an appearance view illustrating the electronic equipment according to the second embodiment of the invention.

FIG. 1A and FIG. 1B are side views of the engaging apparatus 10, and FIG. 2 is an appearance view of equipment 20 utilizing the engaging apparatus 10. As shown in FIG. 1A, the engaging apparatus 10 includes a pivotal device 12 and an engaging device 14. The pivotal device 12 includes a retaining portion 12A. The equipment 20 has a cover 22 and a base 24. The cover 22 is pivotally connected to the base 24 by the pivotal device 12. The engaging device 14 is generally disposed on the cover 22 and includes an operating portion 14A and an engaging portion 14B. The engaging portion 14B cooperates with the retaining portion 12A; preferably, the engaging device 14 is disposed in the housing of the cover 22, so as to add aesthetical value of the equipment by hiding the device.

FIG. 1A is a side view illustrating an engaging apparatus 10 when the cover 22 is positioned at a closed position with respect to the base 24. As shown in FIG. 1A, the engaging portion cooperates with the retaining portion to form a locked engagement in the situation. In the embodiment, an elastomeric device 17 (such as a spring) of the engaging device 14 provides an elastic force to maintain the locked engagement and makes the engaging portion 14B moving tightly against the exterior periphery of the pivotal device 12, so as to close the cover 22.

Relatively, the above-mentioned operating portion 14A is capable of being operated to actuate the engaging portion 14B to depart from the retaining portion 12A so as to release the locked engagement, such that the cover 22 is capable of being operated to rotate with respect to the base 24. That is to say, after the locked engagement is released, the cover 22, which is formerly locked with the base 24, is capable of being opened. FIG. 1B illustrates the releasing of the locked engagement.

For instance, the equipment 20 can be a laptop computer of which the retaining portion 14A can be a groove and the engaging portion 14B can be a tenon. When the cover 22 of the notebook computer is closed with respect to the base 24 (i.e. when the cover 22 is positioned at a closed position with respect to the base 24), the tenon would fit into the groove to form a locked engagement. The locked engagement makes the cover 22 unable to rotate with respect to the base 24. In addition, when the tenon fits into the groove, the operating portion 14A of the notebook computer is capable of being operated to actuate the tenon to depart from the groove, for example, pull the tenon out of the groove to a particular position, and thereby the locked engagement formed by the tenon and the groove is released. That is to say, the cover 22 is capable of rotating with respect to the base 24.

In another embodiment, the positions of the retaining portion 14A and the engaging portion 14B can be exchanged. In the embodiment, the engaging apparatus 10 includes a pivotal device 12 and a retaining device, and the pivotal device 12 includes an engaging portion 14B. The retaining device is disposed on the cover 22 and includes an operation portion 14A and a retaining portion 12A. Similarly, when the cover 22 is positioned at a closed position with respect to the base 24, the retaining portion 12A is capable of cooperating with the engaging portion 14B to form a locked engagement. In the embodiment, the above-mentioned operating portion 14A is capable of being operated to actuate the retaining portion 12A to depart from the engaging portion 14B so as to release the locked engagement, such that the cover 22 is capable of being operated to rotate with respect to the base 24.

Figure 3A:
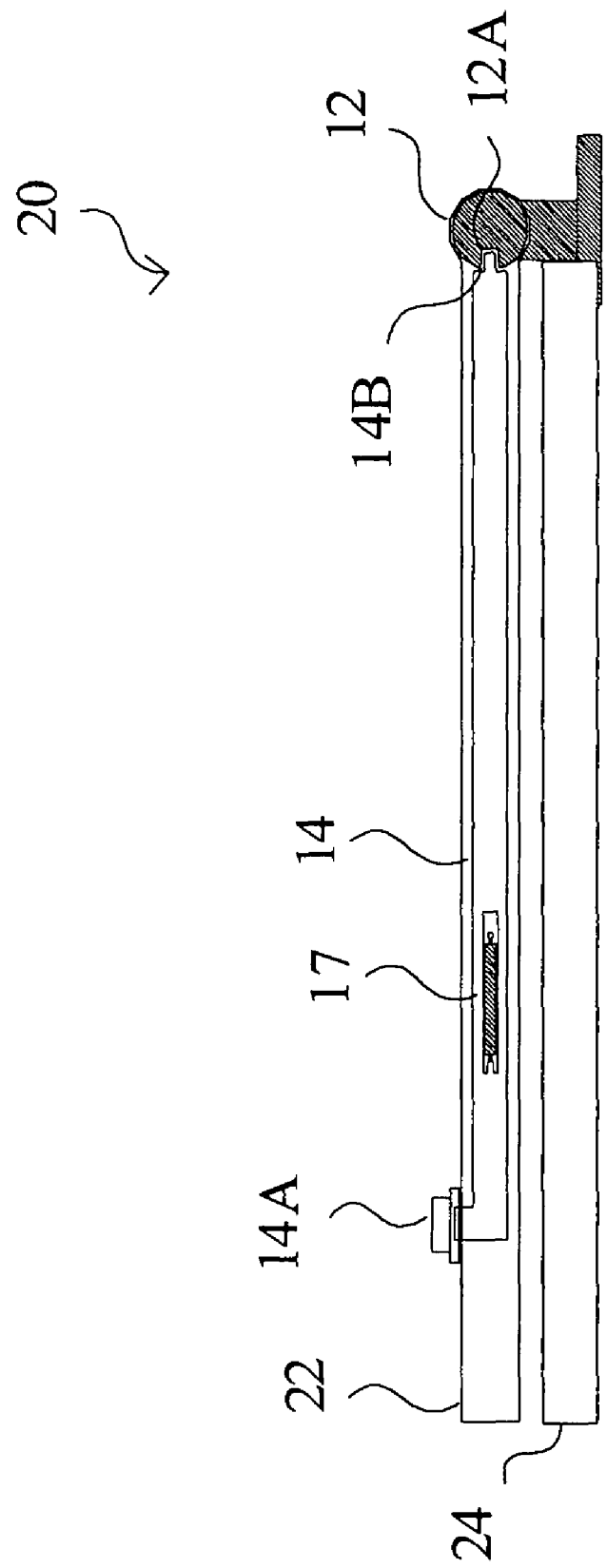
FIG. 3A is a side view illustrating the electronic equipment according to the invention when the locked engagement is formed.
Figure 3B:
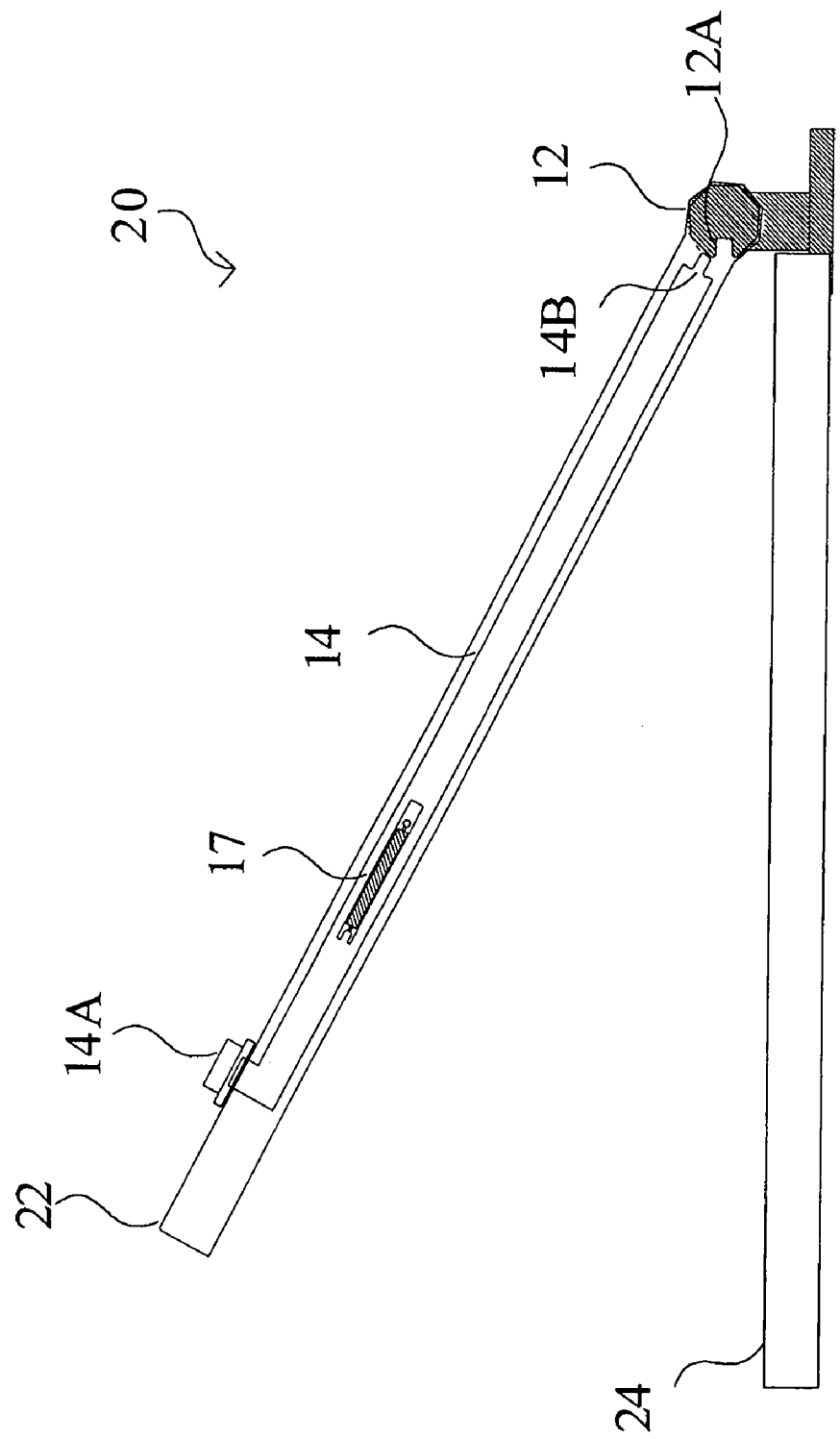
FIG. 3B is a side view illustrating the electronic equipment according to the invention after the locked engagement is removed.

In the second embodiment according to the invention, the equipment 20 as shown in FIG. 2 is an electronic equipment and an engaging apparatus 10 is included therein. FIG. 3A and FIG. 3B are side views illustrating the electronic equipment 20. As shown in FIG. 3A, the electronic equipment 20 includes a cover 22, a base 24, and an engaging apparatus 10. The engaging apparatus 10 includes a pivotal device 12 and an engaging device 14. The pivotal device 12 includes a retaining portion 12A. The cover 22 is pivotally connected to the base 24 by the pivotal device 12. The engaging device 14 is generally disposed on the cover 22 and includes an operating portion 14A and an engaging portion 14B. The engaging portion 14B cooperates with the retaining portion 12A. Preferably, the engaging device 14 is disposed in the housing of the cover 22, so as to add aesthetical value by hiding the engaging device 14.

As shown in FIG. 3A, when the cover 22 is positioned at a closed position with respect to the base 24, the engaging portion 14B is capable of cooperating with the retaining portion 12A to form a locked engagement. At the same time, an elastomeric device 17 (such as a spring) on the engaging device 14 provides an elastic force to maintain the locked engagement and makes the engaging portion 14B moving tightly against the exterior periphery of the pivotal device 12, so as to close the cover.

In addition, as shown in FIG. 3B, the operating portion 14A is capable of being operated to actuate the engaging portion 14B to depart from the retaining portion 12A so as to release the locked engagement, such that the cover 22 is capable of being operated to rotate with respect to the base 24. That is to say, after the locked engagement is released, the cover 22, which is formerly closed with the base 24, is capable of being opened.

Compared with prior arts, the engaging apparatus and the electronic equipment utilizing the same according to the invention are capable of well hiding the grooves and tenons formerly exposed outside of the electronic equipment into the electronic equipment. Accordingly, the engaging apparatus and the electronic equipment utilizing the same according to the invention benefit the appearance design of the electronic equipment and add the whole electronic equipment with an aesthetical appearance.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An engaging apparatus utilized in an electronic equipment having a cover and a base, the engaging apparatus comprising:
   a pivotal device connected to an end of the base, an end of the cover being pivotally connected to the pivotal device such that the cover is swiveled between a folded position, wherein the cover rests against a top surface of the base, and an upright position, wherein the cover is away from the top surface of the base, the pivotal device comprising a retaining portion; and
   an engaging device being disposed on the cover and movable between an engaging position and a release position, the engaging device comprising an operating portion at a first end and an engaging portion at a second opposite end, the engaging portion cooperating with the retaining portion;
   wherein, the sliding movement of the engaging device in a first direction allows the disengagement of the engaging portion from the retaining portion, allowing the cover to be moved to the upright position,
   wherein, when the cover is moved to the folded position, the engaging portion is received in the retaining portion, securing the cover to the base.

2. The engaging apparatus of claim 1, wherein the operating portion protrudes out of the cover and is capable of being operated to actuate the engaging portion to disengage from the retaining portion.

3. The engaging apparatus of claim 1, further comprising an elastomeric device which provides an elastic force to make the engaging portion moving tightly against an exterior periphery of the pivotal device and wherein the retaining portion is disposed on the exterior periphery of the pivotal device to thereby cooperate with the engaging portion.

4. The engaging apparatus of claim 1, wherein the engaging portion is disposed in the cover.

5. The engaging apparatus of claim 1, wherein the retaining portion is a groove.

6. The engaging apparatus of claim 1, wherein the engaging portion is a tenon.

7. The engaging apparatus of claim 3, wherein the elastomeric device is a spring.

8. An engaging apparatus utilized in an electronic equipment having a cover and a base, the engaging apparatus comprising:
   a pivotal device connected to an end of the base, an end of the cover being pivotally connected to the pivotal device such that the cover is swiveled between a folded position, wherein the cover rests against a top surface of the base, and an upright position, wherein the cover is away from the top surface of the base, the pivotal device comprising an engaging portion; and
   a retaining device being disposed on the cover and movable between an engaging position and a release position, the retaining device comprising an operating portion at a first end and a retaining portion at a second opposite end, the retaining portion cooperating with the engaging portion;
   wherein, the sliding movement of the retaining device in a first direction allows the disengagement of the retaining portion from the engaging portion, allowing the cover to be moved to the upright position,
   wherein, when the cover is moved to the folded position, the retaining portion is received in the engaging portion, securing the cover to the base.

9. The engaging apparatus of claim 8, wherein the operating portion protrudes out of the cover and is capable of being operated to actuate the retaining portion to disengage from the engaging portion.

10. The engaging apparatus of claim 8, further comprising an elastomeric device which provides an elastic force to make the retaining portion moving tightly against an exterior periphery of the pivotal device and wherein the engaging portion is disposed on the exterior periphery of the pivotal device to thereby cooperate with the retaining portion.

11. An electronic equipment, comprising:
a base;
a cover; and
an engaging apparatus comprising:
a pivotal device connected to an end of the base, an end of the cover being pivotally connected to the pivotal device such that the cover is swiveled between a folded position, wherein the cover rests against a top surface of the base, and an upright position, wherein the cover is away from the top surface of the base, the pivotal device comprising a retaining portion; and
an engaging device being disposed on the cover and movable between an engaging position and a release position, the engaging device comprising an operating portion at a first end and an engaging portion at a second opposite end, the engaging portion cooperating with the retaining portion;
wherein, the sliding movement of the engaging device in a first direction allows the disengagement of the engaging portion from the retaining portion, allowing the cover to be moved to the upright position,
wherein, when the cover is moved to the folded position, the engaging portion is received in the retaining portion, securing the cover to the base.

12. The electronic equipment of claim 11, wherein the operating portion protrudes out of the cover and is capable of being operated to actuate the engaging portion to disengage from the retaining portion.

13. The electronic equipment of claim 11, further comprising an elastomeric device which provides an elastic force to make the engaging portion moving tightly against an exterior periphery of the pivotal device and wherein the retaining portion is disposed on the exterior periphery of the pivotal device to thereby cooperate with the engaging portion.

14. The electronic equipment of claim 11, wherein the engaging portion is disposed in the cover.

15. The electronic equipment of claim 11, wherein the retaining portion is a groove.

16. The electronic equipment of claim 11, wherein the engaging portion is a tenon.

17. The electronic equipment of claim 13, wherein the elastomeric device is a spring.

18. An electronic equipment, comprising:
a base;
a cover; and
an engaging apparatus comprising:
a pivotal device connected to an end of the base, an end of the cover being pivotally connected to the pivotal device such that the cover is swiveled between a folded position, wherein the cover rests against a top surface of the base, and an upright position, wherein the cover is away from the top surface of the base, the pivotal device comprising an engaging portion; and
a retaining device being disposed on the cover and movable between an engaging position and a release position, the retaining device comprising an operating portion at a first end and an retaining portion at a second opposite end, the retaining portion cooperating with the engaging portion;
wherein, the sliding movement of the retaining device in a first direction allows the disengagement of the retaining portion from the engaging portion, allowing the cover to be moved to the upright position,
wherein, when the cover is moved to the folded position, the retaining portion is received in the engaging portion, securing the cover to the base.

19. The electronic equipment of claim 18, wherein the operating portion protrudes out of the cover and is capable of being operated to actuate the retaining portion to disengage from the engaging portion.

20. The electronic equipment of claim 18, further comprising an elastomeric device which provides an elastic force to make the retaining portion moving tightly against the exterior periphery of the pivotal device and wherein the engaging portion is disposed on the exterior periphery of the pivotal device to thereby cooperate with the retaining portion.

* * * * *